United States Patent [19]

Lebaron et al.

[11] Patent Number: 4,588,114
[45] Date of Patent: May 13, 1986

[54] BAGGAGE DEVICE FOR MOTORCYCLES AND THE LIKE

[76] Inventors: Richard Lebaron, 1, Avenue du Général Balfourier, F-75016 Paris; Gilles Dumoulin, 12, rue Alfred, F-92140 Clamart, both of France

[21] Appl. No.: 624,903

[22] Filed: Jun. 26, 1984

[51] Int. Cl.$^4$ .............................................. B62J 7/04
[52] U.S. Cl. .............................. 224/32 A; 224/42.44; 224/39
[58] Field of Search ................ 224/32 A, 32 R, 42.44, 224/36, 39, 319, 314, 315

[56] References Cited

U.S. PATENT DOCUMENTS 4,249,684  2/1981  Miller et al. .................... 224/319
4,266,703  5/1981  Litz .................................. 224/32 A Primary Examiner—Stephen Marcus
Assistant Examiner—David Voorhees
Attorney, Agent, or Firm—Young & Thompson

[57] ABSTRACT

A base for removably mounting a carrier box is permanently fixed on a motorcycle baggage-carrier frame. The underface of the carrier box has a recessed portion with grooves at each end for slidably engaging the carrier box on flanges of the base and locking the box in position by means of a latch mechanism, thus providing a theft-proof device and enabling the user to remove the box and carry it by hand in the same manner as a briefcase or suitcase.

5 Claims, 7 Drawing Figures

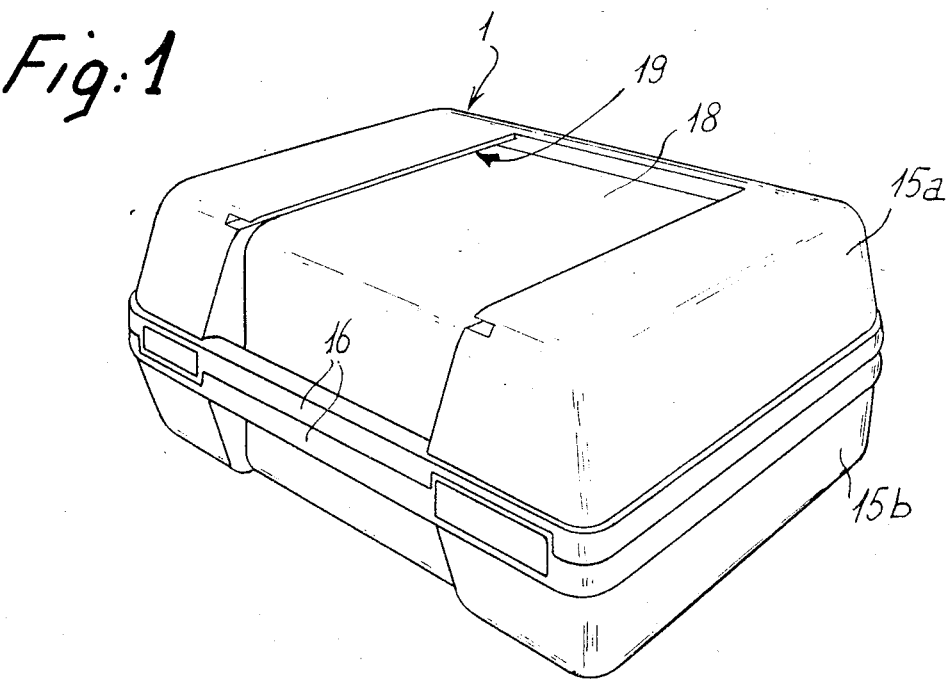
Fig: 1
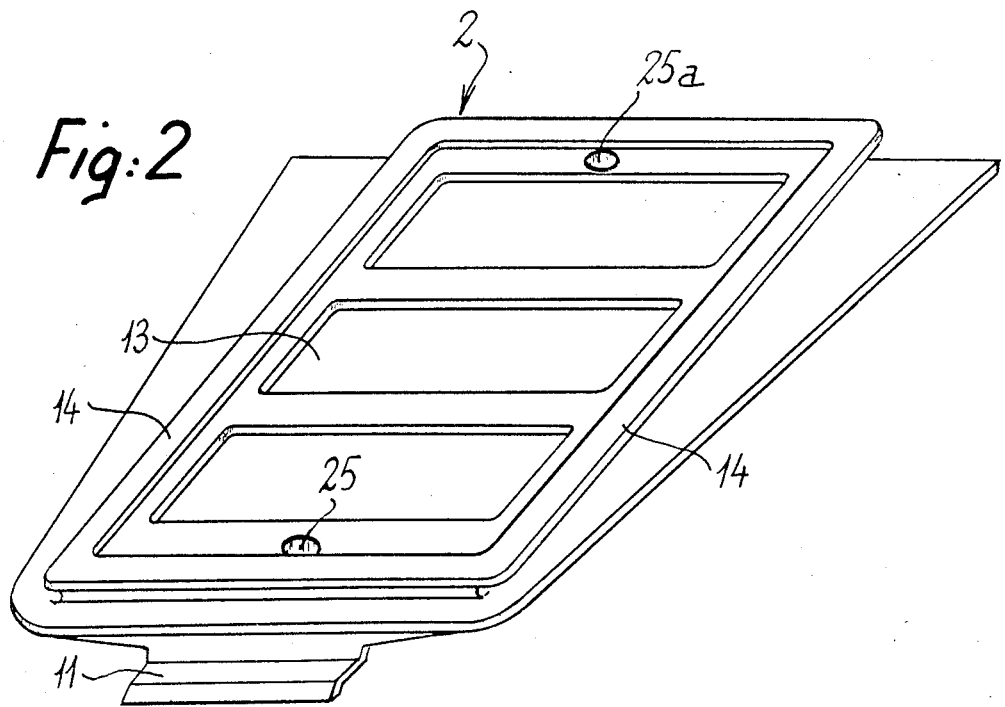
Fig: 2

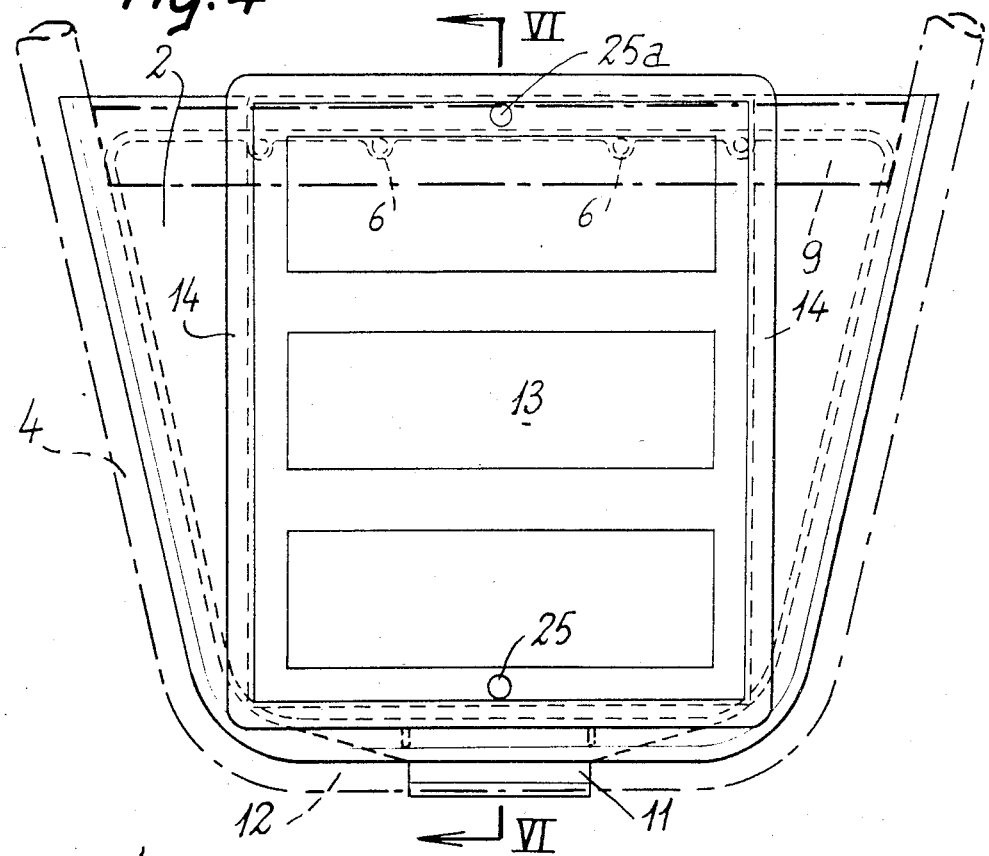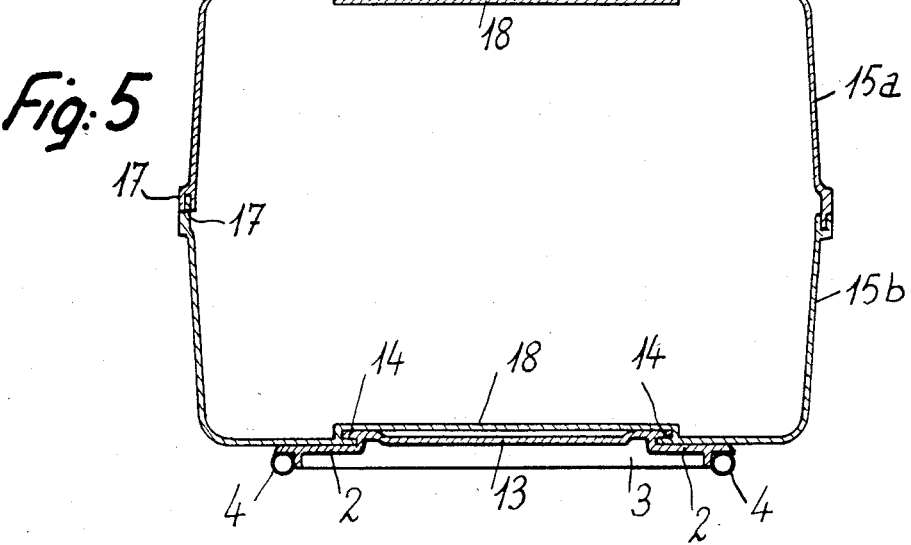

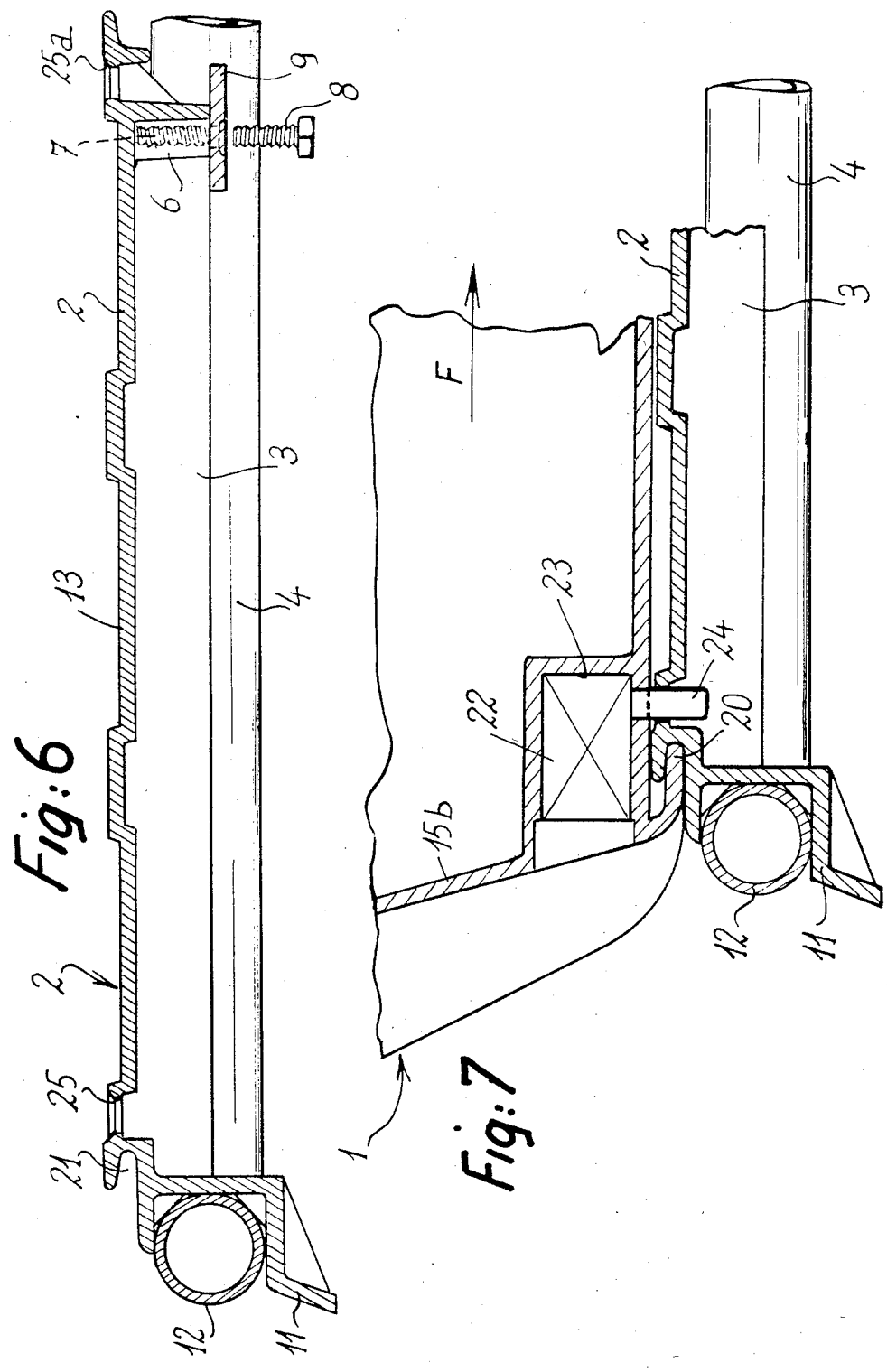

BAGGAGE DEVICE FOR MOTORCYCLES AND THE LIKE

This invention relates to baggage which is intended to be transported on the baggage-carrier of a motorcycle or the like and also relates to the attachment of baggage on a carrier of this type.

Motorcyclists and users of similar machines have acquired the increasingly common habit of placing their baggage or other objects to be transported within small rigid boxes fixed on the baggage-carrier of the machine employed. Boxes of this type do in fact offer undeniable advantages over the saddlebags which had previously been used for the same purpose.

In the majority of cases, the boxes thus employed are fixed on the baggage-carrier of a motorcycle in a detachable manner by means of straps and the like. It is therefore only necessary for the user to remove these fastening means in order to take hold of the box and thus readily transport the objects contained in the box. However, a serious disadvantage of this solution lies in the fact that, should a motorcycle be left unattended on a parking location, the motorcyclist is obliged to take the box with him in order to avoid any risk of theft, even if the box is empty. Furthermore, the attachment of a box of this type by means of straps or the like constitutes a solution which is not very practical and is wholly unattractive.

For this reason, carrier boxes specially designed for attachment to the baggage-carriers of motorcycles or the like have already been proposed and are provided for this purpose with suitably adapted fastening means as well as a locking system if necessary. However, the boxes of this type which have been produced up to the present time as well as their fastening systems are not very convenient to use in practice. Furthermore, these carrier boxes do not have an attractive appearance by reason of the visible presence of the means provided for their attachment and in some cases for locking them.

For the reasons just stated, the object of the present invention is to produce a baggage device for a motorcycle, comprising a carrier box which can be fixed in position with great ease and has the normal attractive appearance of a portable box.

This device comprises a box which can be detachably fixed on a base which is in turn permanently fixed on the top platform of a motorcycle baggage-carrier, said box being fixed in position by means of a slide system and a locking system. However, the distinctive feature of the device in accordance with the invention lies in the fact that the underface of the carrier box has a set-back portion on each side of which are provided grooves forming part of the slide assembly system which serves to fix said box on the base of said device. In accordance with this arrangement, the flanges of said slide assembly system are carried by said base.

Thus the carrier box of the present device can be very readily and rapidly fixed in position or withdrawn, optimum securement being achieved after positioning. This box nevertheless has the normal attractive appearance of a portable box since the grooves of the slide assembly system are located on the sides of the setback portion provided on the underface of the box and are therefore concealed from view.

In accordance with another distinctive feature, the flanges and grooves of the system of assembly of the carrier box on the fastening base extend in the longitudinal direction and provision is made for a stop which prevents any further sliding displacement of the carrier box when this latter has reached its final position on the base.

In accordance with yet another distinctive feature, the carrier box is constituted by two shells which are identical with each other and the large faces of which each have two grooves for receiving the longitudinal flanges of the fastening base of the present device.

Other features of the invention will be more apparent upon consideration of the following description and accompanying drawings, wherein:

FIGS. 1 and 2 are views in perspective to a different scale showing the two constituent elements of the device considered, namely on the one hand the carrier box of the device and on the other hand the base which is intended to receive said box;

FIG. 4 is a top plan view of a fastening base which forms part of the device in accordance with the invention;

FIG. 5 is a vertical sectional view taken along a transverse plane and showing the carrier box of the device under consideration, this box being shown after fixing on the corresponding base;

FIG. 6 is a sectional view taken along line VI—VI of FIG. 4 but to a different scale;

FIG. 7 is a fragmentary sectional view taken along the same plane of section but to a different scale and illustrating the mode of locking of the carrier box of the present device on the corresponding fastening base.

Figure 3:
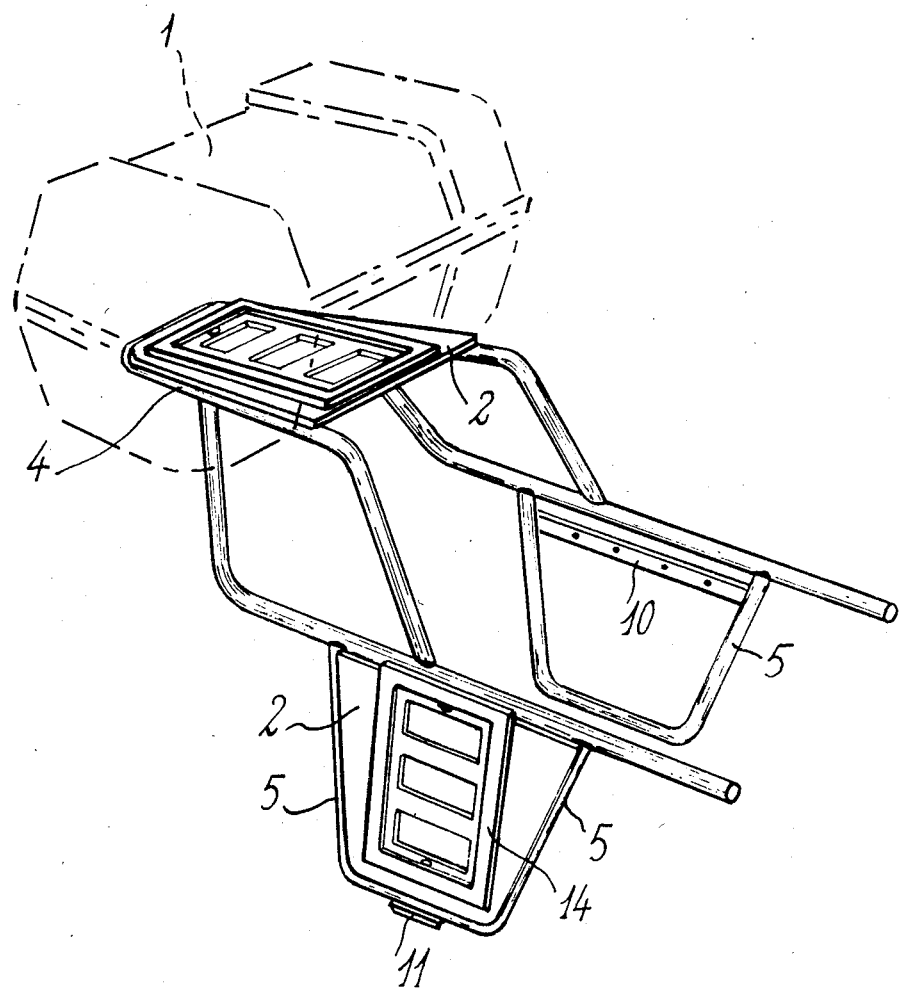
FIG. 3 is a view in perspective showing a motorcycle baggage-carrier on which two fastening bases in accordance with the invention are mounted, a single carrier box being shown in chain-dotted lines above the base which is fixed on the top platform of said baggage-carrier.

As already mentioned, the device in accordance with the invention comprises two complementary elements, namely a carrier box 1 and a fastening base 2 for receiving a box of this type. In the example which is illustrated, said base is constituted by a plate having a trapezoidal contour, the bottom face of which is provided with a skirt 3 having the same contour but set-back with respect to the periphery of said plate.

Under these conditions, the base plate can be inserted between the sides of the top platform 4 of a motorcycle baggage-carrier such as the carrier shown in FIG. 3.

However, as illustrated in the same figure, said base can also be disposed vertically and inserted within each of two inverted arches or stirrup-pieces 5 which already exist on the sides of the same baggage-carrier and which are usually intended to serve as supports for the attachment of saddlebags.

Along that side of the base which has the greater length, the skirt 3 of said base is provided on its inner face with bulges 6 within which are formed internally-threaded bores 7. These bores are intended to receive fixing screws 8 which are engaged through holes formed in the horizontal cross-member 9 of the top platform of the baggage-carrier (as shown in FIG. 6). Similarly, when a base of this type is secured against a side-stirrup 5, it is fixed in position by means of screws engaged in the same bores 7 after said screws have been passed through holes formed in a top cross-member 10 or in vertical lugs provided at the top of the corresponding stirrup-piece.

The base 2 is provided at the opposite end with an elbowed lug 11 which is capable of fitting over the rear side 12 of the top platform 4 of the corresponding baggage-carrier (as shown in FIG. 6). However, when the same base is fixed vertically against a side-stirrup 5, said lug is fitted around the bottom arm of this latter as shown in FIG. 3.

In both cases, the base thus provided is therefore perfectly secured to the corresponding portion of the baggage-carrier. The same base is intended to serve as a support for the carrier-box 1 which forms part of the device in accordance with the invention.

Fastening of said box on said base is achieved by means of a slide assembly system constituted by flanges and corresponding grooves. In practice, the base 2 comprises a raised portion 13 having a rectangular contour, the longitudinal sides of which have outwardly-projecting flanges 14. In regard to the carrier box 1, grooves are formed in the bottom face of said box for the purpose of receiving the projecting flanges 14 thus provided on the base 2.

Said carrier box is constituted by two identical shells 15a and 15b joined together by means of a hinge (not shown) provided on the side opposite to the intended location of a handle 16 formed by two complementary bars carried by each shell. The edges of said shells have lips 17 which are intended to interengage in order to ensure tight closure of the box (as shown in FIG. 5).

The large face of each shell 15a and 15b has a portion 18 which is set-back with respect to the level of said face. Moreover, the longitudinal sides of this setback portion each have a groove 19 which is intended to receive one of the projecting flanges 14 of the fastening base 2. In practice, only the grooves 19 of the lower shell 15b are intended to receive these projecting flanges. In point of fact, the grooves 19 of the upper shell 15a serve no useful purpose but exist simply by reason of the fact that, in order to reduce the cost price of the carrier box under consideration, the two shells 15a and 15b are absolutely identical and are manufactured by molding from synthetic resin in a mold of exactly the same shape.

By virtue of the arrangement thus contemplated, the carrier box 1 can be fixed on the base 2 by means of a simple sliding movement in the direction of the arrow F (as shown in FIG. 7) after the grooves 19 of its lower shell 15b have been placed opposite to the projecting flanges 14 of said base. However, this sliding movement is arrested by a stop when said box has reached its final position above the fastening base 2. This stop can be constituted by a tongue 20 which is formed at the rear end of the grooves 19 and comes into abutting contact with the bottom of a groove 21 formed in the rear edge of the base 2 (as shown in FIG. 7).

However, provision is also made for a locking system which is intended to prevent any untimely withdrawal of the carrier box 1. This system is constituted by a latch mechanism 22 placed within a housing 23 arranged at the lower end of the lower shell 15b of the carrier box. Said latch mechanism comprises a projecting locking-bolt 24 which is capable of coming into a position of engagement within a hole 25. Said hole is formed at the rear end of the base 2 and thus serves as a catch for said bolt (as shown in FIGS. 6 and 7).

In order to remove the carrier box 1, it is only necessary to slide it along the fastening base 2 in the direction opposite to the arrow F after having withdrawn the locking-bolt 24 of the latch mechanism 22. In consequence, the box can then be employed for carrying bags and other items contained therein.

However, should the user not need to carry with him the objects contained in the box, he may leave the box in its place without any danger of theft. The latch mechanism 22 in fact prevents any possibility of untimely removal of said box.

As mentioned earlier, the base 2 of the device in accordance with the invention can be permanently fixed, not only on the top platform 4 of a baggage-carrier of the type shown in FIG. 3, but also on the side stirrups 5 of the carrier. It is therefore possible to fix a carrier box 1 on each side of the baggage-carrier by mounting these two boxes on the corresponding bases. In such a case, these boxes are oriented in such a manner that their carrying handles 16 are located at the top. It is for this reason that the bases 2 are provided with a second hole 25a which is intended to serve as a catch for the locking-bolt 24 of the latch mechanism 22 and which is located near the long side of each base.

A total of three separate and distinct carrier boxes can therefore be mounted on one and the same baggage-carrier.

However, it is also possible to mount only two lateral boxes while dispensing with a top box, or conversely.

It will be readily apparent that the device in accordance with the invention is not limited to the single example of construction which has been described in the foregoing and illustrated in the accompanying drawings solely by way of indication. If so required, the fastening base 2 could thus have a shape other than the shape which is contemplated in this example and which is specially designed for a baggage-carrier of the type shown in FIG. 3. If necessary, said base could have a rectangular shape and could be designed so as to be secured to any type of baggage-carrier, this being made possible by means of fixing lugs or any other suitable elements. However, it will be clearly understood that in such a case, the fastening base would continue to have outwardly-projecting longitudinal flanges 14 which are intended to engage within the grooves 19 of a carrier box in accordance with the invention.

So far as the carrier box itself is concerned, the box can have a different shape. Thus, instead of having the shape of a box of relatively substantial height, it could be designed in the form of a flat suitcase, attaché-case or briefcase. In fact one of the important advantages of the device in accordance with the invention lies in the fact that the carrier box which forms part of this latter can be provided in the form of a box or briefcase which remains of wholly conventional design, with the sole exception of the grooves 19. However, the presence of these grooves is practically not visible, taking into account the fact that they are located at the sides of the recessed portion 18 formed in each shell of the carrier box. It may in fact be added that this recessed portion has rather the effect of improving the outward appearance of this carrier box. Under these conditions, the user is thus provided with a case of conventional appearance which he can carry with him and use without any difficulty or inconvenience in many different circumstances. It is also worthy of note in this connection that, by reason of the shape of its external faces, the carrier box in accordance with the invention can be laid flat on a table or any other support in the same manner as a conventional suitcase.

As has already been mentioned in the foregoing, the two shells constituting said carrier box are advantageously manufactured by molding from synthetic resin and the same applies to the fastening base 2.

What is claimed is:

1. In a luggage mount for a motorcycle or the like, comprising a luggage box adapted to be detachably secured to a base member permanently secured to the top platform of a motorcycle luggage carrier, said box being secured by means of a set of guide grooves and a locking system; the improvement in which the base member of said mount comprises two parallel opposite outwardly projecting ledges, the bottom surface of said luggage box has a recessed central portion having grooves along its lateral sides adapted to receive said ledges when said box is positioned on said platform, and a stop member for limiting sliding movement of said box on said ledges in a selected position of said box, said bottom surface of said luggage box being comprised substantially entirely of three flat parallel surface portions disposed in a series extending from end to end of the luggage box, the central of said three surface portions comprising said recessed portion.

2. A luggage mount as claimed in claim 1, in which said locking system is disposed in a recess in one of the walls of said box.

3. A luggage mount as claimed in claim 2, in which said locking system includes a bolt extensible and retractable through said recessed portion of said bottom surface of said luggage box.

4. A luggage mount as claimed in claim 1, in which said luggage box consists of an assembly of two identical shells comprising each on their major face a said recessed portion formed along its edges with said guide grooves.

5. A luggage mount as claimed in claim 1, in which said locking system comprises a lock on said box, said lock having a retractable bolt that projects into an opening in said base member, said bolt being disposed between said grooves and forward of said stop member with respect to the direction of sliding movement of the box onto said base member.

* * * * *